(12) United States Patent
Pramod et al.

(10) Patent No.: US 11,117,612 B2
(45) Date of Patent: Sep. 14, 2021

(54) DITHER NOISE MANAGEMENT IN ELECTRIC POWER STEERING SYSTEMS

(71) Applicant: STEERING SOLUTIONS IP HOLDING CORPORATION, Saginaw, MI (US)

(72) Inventors: Prerit Pramod, Saginaw, MI (US); Michael Eickholt, Chesaning, MI (US); Krishna MPK Namburi, Saginaw, MI (US); Matthew A. Tompkins, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 249 days.

(21) Appl. No.: 15/916,824

(22) Filed: Mar. 9, 2018

(65) Prior Publication Data

US 2019/0276073 A1 Sep. 12, 2019

(51) Int. Cl.
| | |
|---|---|
| *B62D 5/04* | (2006.01) |
| *B62D 6/08* | (2006.01) |
| *B62D 6/02* | (2006.01) |
| *B62D 6/00* | (2006.01) |

(52) U.S. Cl.
CPC .......... *B62D 5/0463* (2013.01); *B62D 6/008* (2013.01); *B62D 6/02* (2013.01); *B62D 6/08* (2013.01)

(58) Field of Classification Search
CPC .......... B62D 5/0463; B62D 6/10; B62D 6/08; B62D 5/0472; B62D 6/008; H02P 21/05
See application file for complete search history.

(56) References Cited

U.S. PATENT DOCUMENTS

| | | | |
|---|---|---|---|
| 5,473,231 A | 12/1995 | McLaughlin et al. | |
| 5,704,446 A | 1/1998 | Chandy et al. | |
| 6,107,767 A | 8/2000 | Lu et al. | |
| 6,588,541 B2* | 7/2003 | Norman ............... | B62D 5/0484 180/446 |
| 7,132,811 B2 | 11/2006 | Katch et al. | |
| 2003/0055543 A1* | 3/2003 | Amberkar ............... | B62D 6/04 701/41 |

(Continued)

FOREIGN PATENT DOCUMENTS

| | | |
|---|---|---|
| CN | 101927786 A | 12/2010 |
| CN | 105209320 A | 12/2015 |

(Continued)

OTHER PUBLICATIONS

Search Report in corresponding CN App. No. 201910181561.9; dated Apr. 19, 2021.

*Primary Examiner* — Kenneth J Malkowski
(74) *Attorney, Agent, or Firm* — Dickinson Wright PLLC

(57) ABSTRACT

Technical solutions are described for attenuating dither noise in a steering system. An example method includes computing multiple filter parameters, each filter parameter based on a corresponding signal in the steering system. The method further includes determining at least one final filter parameter from the plurality of filter parameters by arbitrating the plurality of filter parameters. The method further includes dynamically configuring a filter using the at least one final filter parameter. Further, the method includes filtering a motor torque command using the filter, a filtered motor torque command being applied to a motor to generate a corresponding amount of torque.

18 Claims, 6 Drawing Sheets

(56) References Cited

U.S. PATENT DOCUMENTS

| | | | | |
|---|---|---|---|---|
| 2005/0251311 A1* | 11/2005 | Burton | ................ | B62D 5/0463 |
| | | | | 701/41 |
| 2008/0147276 A1* | 6/2008 | Pattok | ...................... | B62D 6/04 |
| | | | | 701/42 |
| 2011/0054737 A1* | 3/2011 | Naik | .................... | B62D 5/0463 |
| | | | | 701/41 |
| 2013/0066520 A1* | 3/2013 | Hales | .................. | B62D 5/0463 |
| | | | | 701/41 |
| 2015/0239491 A1* | 8/2015 | Bolourchi | ............ | B62D 5/0463 |
| | | | | 701/41 |
| 2016/0288825 A1* | 10/2016 | Varunjikar | ........... | B62D 5/0463 |
| 2017/0029019 A1* | 2/2017 | Hales | .................. | B62D 5/0463 |

FOREIGN PATENT DOCUMENTS

| | | |
|---|---|---|
| CN | 107000785 A | 8/2017 |
| EP | 0943527 A2 | 9/1999 |
| JP | 2010069975 A | 4/2010 |

* cited by examiner

DITHER NOISE MANAGEMENT IN ELECTRIC POWER STEERING SYSTEMS

BACKGROUND

The present application is generally related to dither noise management in electric power steering systems.

Dither noise refers to a low frequency noise that typically exists in Electric Power Steering (EPS) systems. The existing evidence suggests that the primary source of the dither noise is a handwheel torque sensor used in the EPS system. The sensed torque signal has noise due to inherent noise in the sensed analog signals, quantization noise in digital sensors as well as A/D converters. The dither noise causes discomfort for an operator of the EPS. Accordingly, it is desirable to reduce, if not completely eliminate the dither noise in EPS.

SUMMARY

According to one or more embodiments, a method for attenuating dither noise in a steering system includes computing multiple filter parameters, each filter parameter based on a corresponding signal in the steering system. The method further includes determining at least one final filter parameter from the plurality of filter parameters by arbitrating the plurality of filter parameters. The method further includes dynamically configuring a filter using the at least one final filter parameter. Further, the method includes filtering a motor torque command using the filter, a filtered motor torque command being applied to a motor to generate a corresponding amount of torque.

According to one or more embodiments, an apparatus for managing dither noise in a steering system includes a filter module that generates a filtered motor torque command based on an input torque command, the filtered motor torque command being applied to a motor to generate a corresponding amount of torque. The apparatus further includes a filter parameter determination module that computes a plurality of filter parameters, each filter parameter based a corresponding signal in the steering system. The apparatus further includes an arbitration module that determines at least one final filter parameter from the plurality of filter parameters by arbitrating the plurality of filter parameters, and dynamically configures the filter module using the at least one final filter parameter.

According to one or more embodiments, a steering system includes a motor that generates an amount of torque corresponding to a motor torque command The steering system further includes a filter module that generates a filtered motor torque command based on an input torque command, the filtered motor torque command being applied to the motor to generate the corresponding amount of torque. The steering system further includes a filter parameter determination module that computes a plurality of filter parameters, each filter parameter based a corresponding signal in the steering system. The steering system further includes an arbitration module that determines at least one final filter parameter from the plurality of filter parameters by arbitrating the plurality of filter parameters, and dynamically configures the filter module using the at least one final filter parameter.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
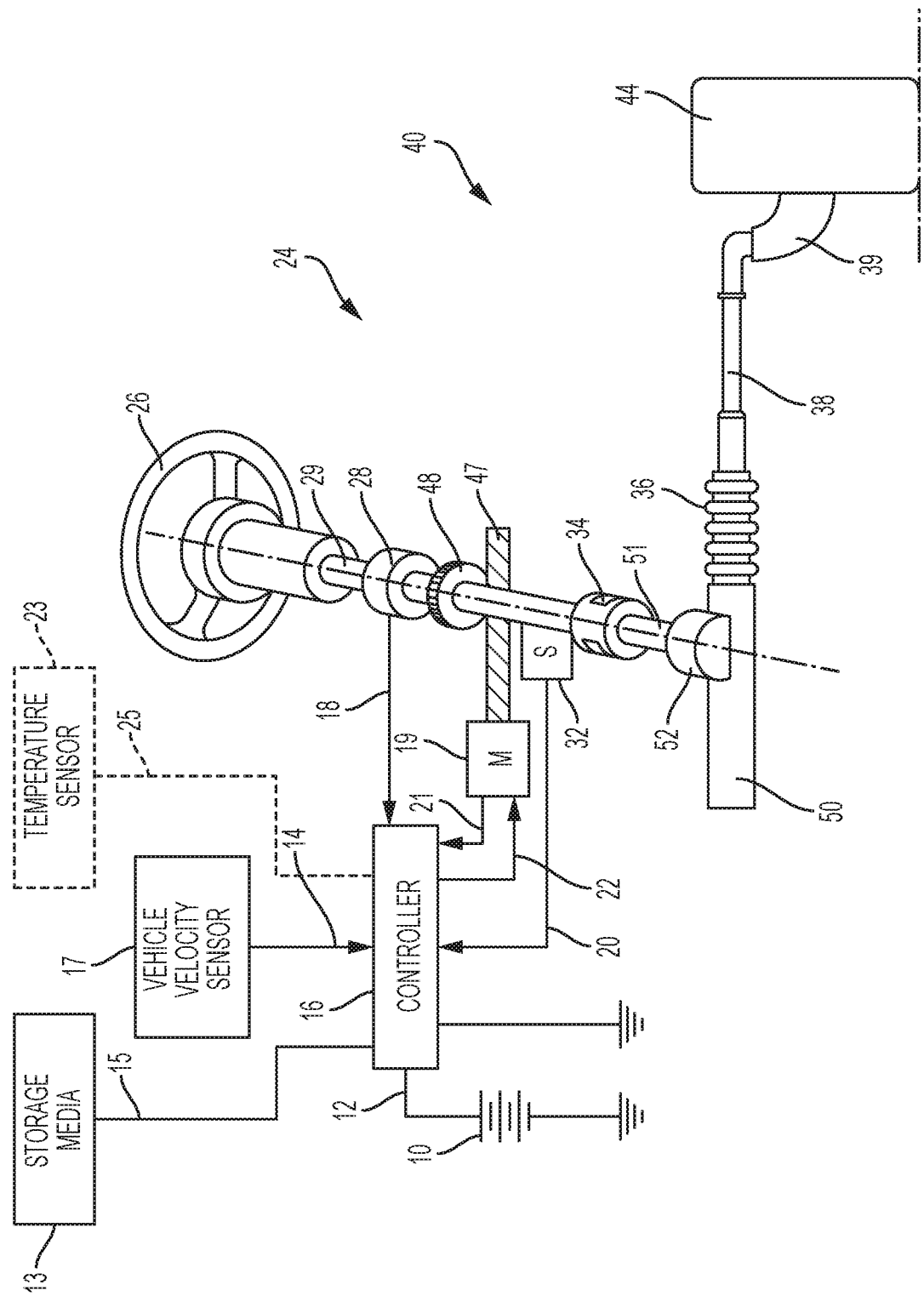
FIG. 1 is an exemplary embodiment of an electric power steering system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As described earlier, dither noise refers to a low frequency noise that exists in an EPS system, typically caused by the handwheel torque sensor. The sensed torque signal has noise due to inherent noise in the sensed analog signals, quantization noise in digital sensors as well as A/D converters. The technical solutions described herein address such technical challenge of the dither noise by facilitating reduction in the dither noise. In one or more examples, the technical solutions use conditional filtering of the motor torque command signal as a function of multiple system state variables including motor velocity and acceleration, handwheel torque and vehicle speed to attenuate dither noise, while maintaining the stability and performance of the entire EPS system. Since the motor torque is a translation of the handwheel torque signal, filtering the motor torque signal reduces the dither noise substantially. The technical solutions described herein strategically use the filtering between the EPS mechanical control and the electric motor control blocks such that the tuning of either is not affected substantially by the filtering.

Figure 2:
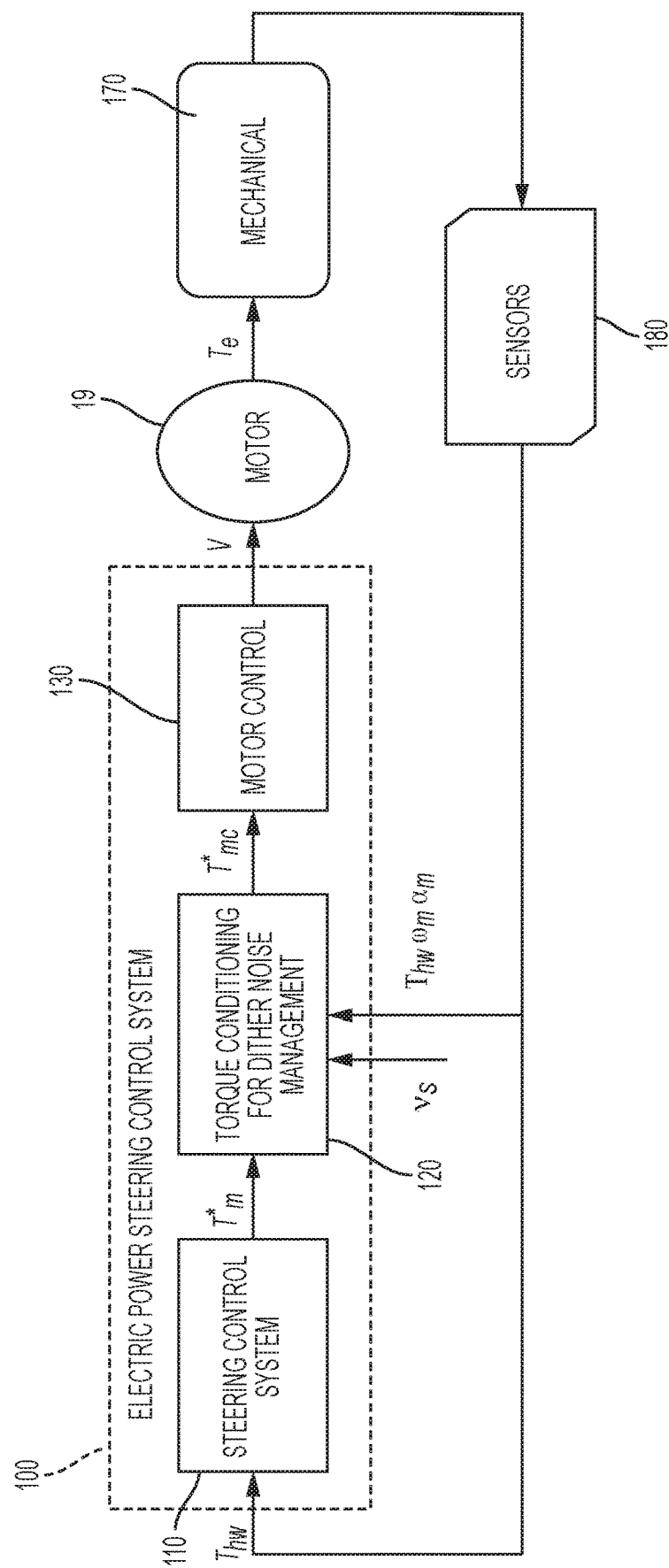
FIG. 2 depicts an EPS control system with dither noise management according to one or more embodiments.

FIG. 2 depicts an EPS control system with dither noise management according to one or more embodiments. FIG. 2 represents the EPS system 40 using blocks for the motor 19 that provides torque (Te) to the mechanical system 170 that is responsible for transferring the torque to the wheels of the vehicle. The mechanical system 170 varies depending on the type of the EPS 40, for example, if the EPS 40 is a steer by wire system, the mechanical system 170 may include more electric signal transferring components compared to a driveshaft and other mechanical components in a typical power steering system.

The electric power steering control system 100 includes a steering control system 110 that generates a torque command ($T_m^*$) for maneuvering the vehicle. In one or more examples, the steering control system 110 may include a handwheel operated by a human operator. Alternatively, or in addition, the steering control system 110 includes an automatic drive assist system (ADAS) that maneuvers the vehicle. The torque command generated by the steering control system is provided to the motor 19 to generate assist torque. The torque command is applied to the motor 19 after being converted into motor voltage commands by a motor control 130, which may be a motor control system that operates using a feedback and/or feedforward operation mode. In one or more examples, the EPS control system 100 monitors the torque that is generated by the mechanical system 170 using one or more sensors 180. Additionally, the technical solutions herein use a torque conditioning block 120 in the EPS control system 100.

The torque conditioning block 120 that provides the dither noise management includes a filter whose parameters are varied in real-time as a function of one or more signals, along with an arbitration module, which monitors the parameter value variations due to different signal signatures and determines the final value (based on dither noise requirements along with steering system as well as vehicle stability conditions). Dither noise is typically audible at lower motor velocities when the vehicle is near stall, where the other vehicle noises are low. When the motor 19 rotates faster or the vehicle speed is high, dither noise gets masked by the other noises.

Figure 3:
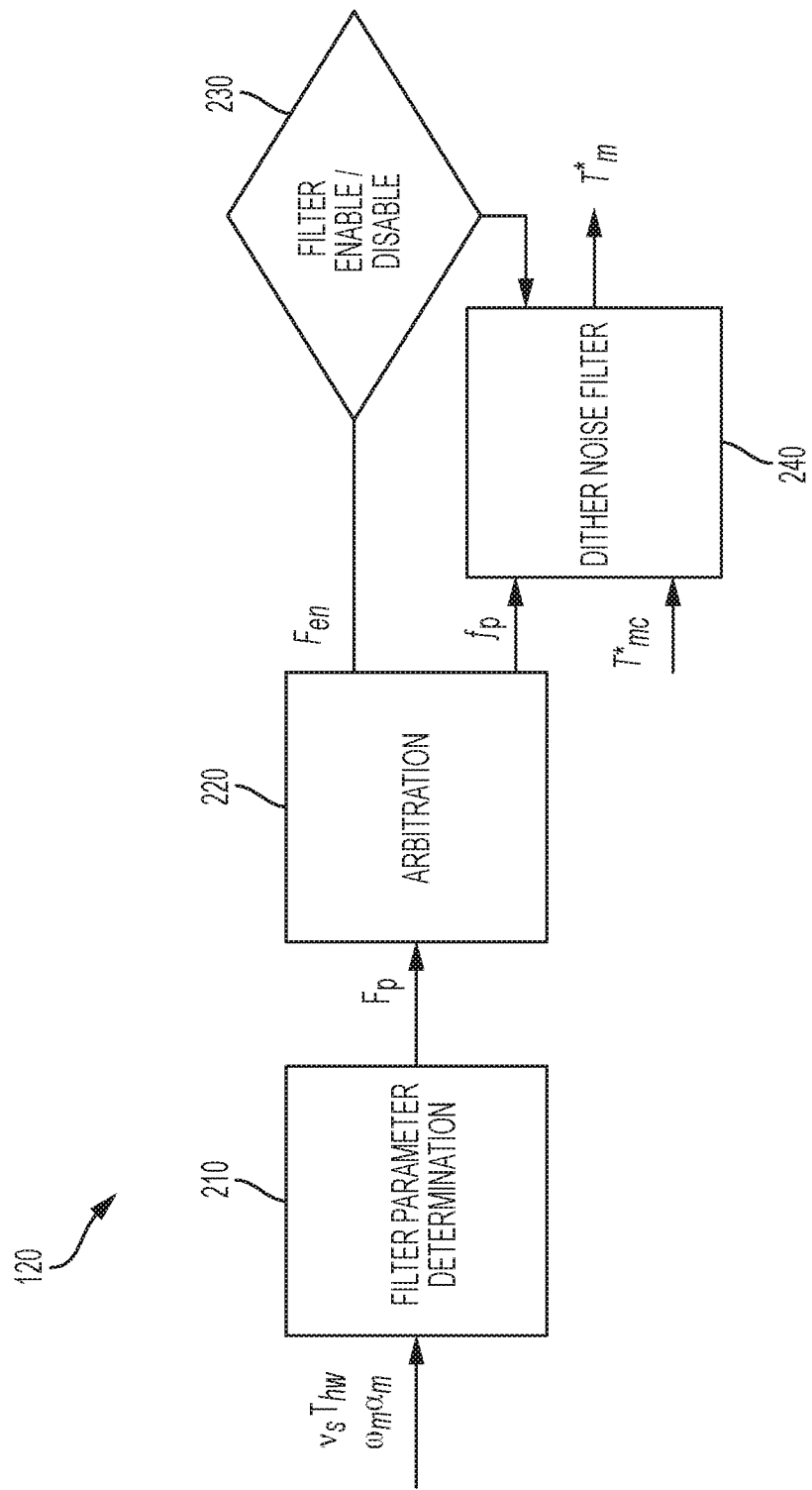
FIG. 3 depicts a dataflow block diagram of the dither noise management provided by the torque conditioning block according to one or more embodiments.

FIG. 3 depicts a dataflow block diagram of the dither noise management provided by the torque conditioning block according to one or more embodiments. The torque conditioning block 120 provides dither noise management using one or more input signals. The torque conditioning block includes a filter parameter determination module 210, an arbitration module 220, a filter enabler module 230, and a dither noise filter module 240, among other components. The components include hardware components and software components.

As shown in the figure, the filter parameter determination module 210 determines at least four sets of filter parameters $F_p$ based on the different input signals. Thereafter, the arbitration module 220 determines the final filter parameters $f_p$ along with a flag $F_{en}$. The filter enabler module 230 uses the flag for enabling or disabling the filter 240. The filter 240 then uses the final filter parameters and filters the motor torque command $T^*_{mc}$ to produce the final motor torque command $T^*_m$.

Based on the type of the filter 240, the arbitration module 220 determines which final filter parameters to generate. For example, if the filter 240 is a low-pass filter, the final filter parameters generated include the cutoff frequency for the low-pass filter. The filter 240 used for dither noise management may be a simple low pass filter or a more complex filter such a band-reject filter. The final goal is to be able to filter the noise frequencies in the dither range (for example, in the range 200 to 400 Hz, however the range may be different for different systems). In some cases, depending on stability or performance conditions, the filter 240 may be disabled altogether by the filter enabler module 230 using the flag $F_{en}$. Examples of different filters (continuous and discrete time implementations) that may be used for dither noise filtering are described herein.

Figure 4:
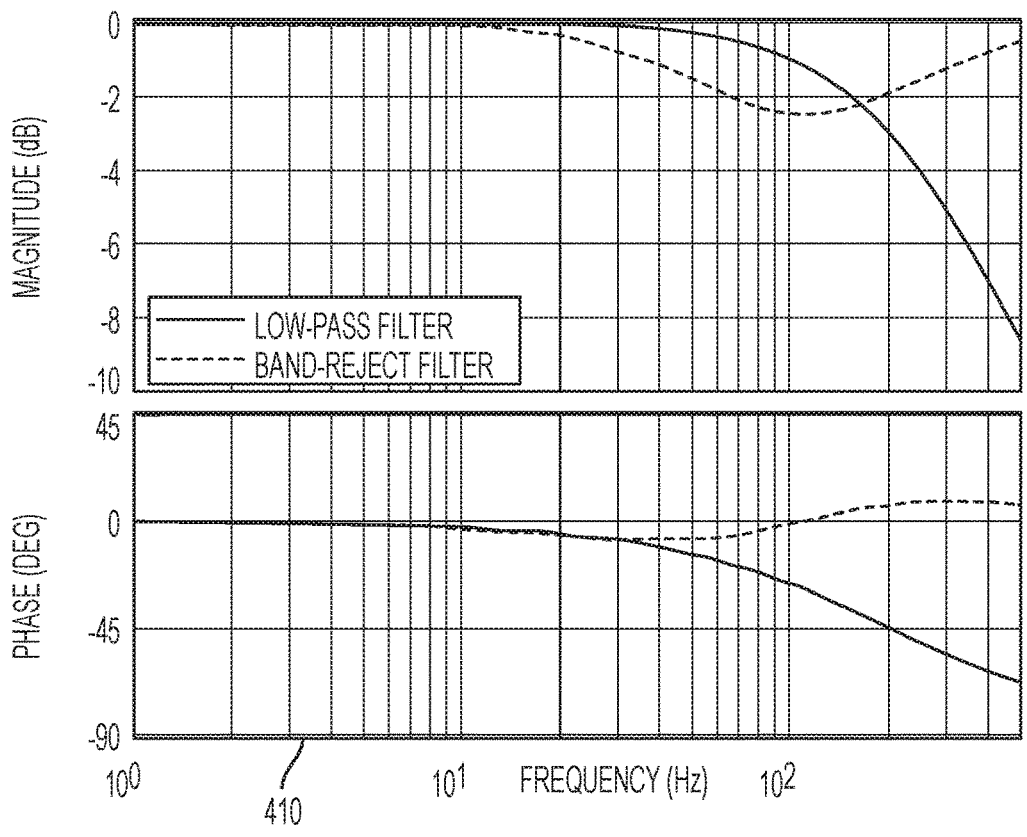
FIG. 4 depicts examples of filter implementations for the dither noise management according to one or more embodiments.
Figure 4:
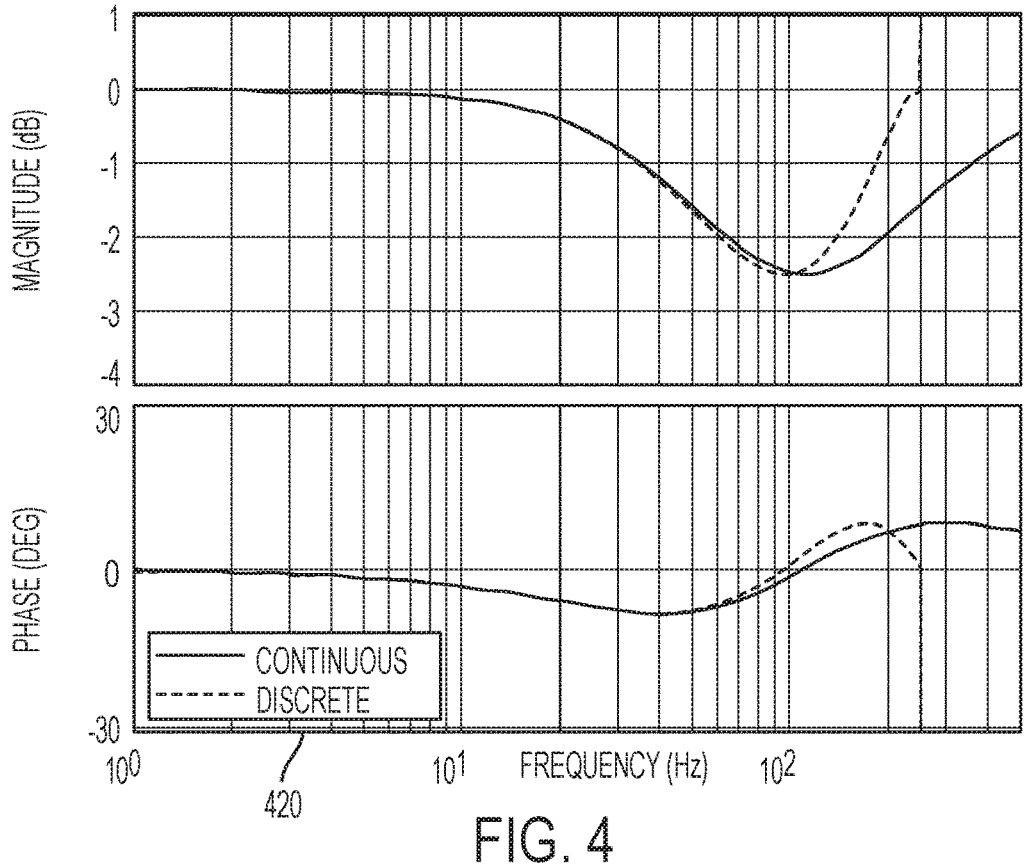

FIG. 4 depicts examples of filter implementations for the dither noise management according to one or more embodiments. For example, plot 410 shows examples of continuous time filters and the plot 420 depicts examples of a discrete time filters. The transfer functions of continuous time filters such as a low-pass (LPF) filter or a band-reject filter (BRF) may be as follows.

$$H_{LPF}(s) = \frac{\omega_c}{s + \omega_c}$$

$$H_{BPF}(s) = \frac{\omega_d^2 s^2 + 2\zeta_n \omega_n s + \omega_n^2}{\omega_n^2 s^2 + 2\zeta_d \omega_d s + \omega_d^2}$$

where $\omega_c$ is the cut-off frequency of the LPF, while $\omega_n$, $\omega_d$ are the natural frequencies and $\zeta_n$ and $\zeta_d$ are the damping ratios of the BRF.

It should be noted that the above are examples of filters, and in other embodiments, any filter design that provides magnitude attenuation in the desired frequency range may be used instead.

In one or more examples, in the case of the band-reject filter, for instance, the filter parameters $\omega_n$, $\omega_d$, $\zeta_n$ and $\theta_d$ are varied in real-time as a function of the vehicle speed, handwheel torque, motor velocity, and motor acceleration to perform the filtering. Any discretization techniques may be used for implementing the filter in embedded software, such as the Tustin transform for which the s to z domain relationship is as follows.

$$s = \frac{2}{T_s} \frac{z-1}{z+1}$$

As described herein, the torque conditioning block 120 only performs the filtering under specific conditions where the dither noise is audible (when no filtering is applied). This ensures that stability and performance of the EPS system 40 is preserved while the dither noise is reduced simultaneously. The criteria for scheduling the filter parameters as a function of each of the EPS system signals is described further herein. While the example of a low-pass filter is used for the description, it should be understood that the same idea may be easily applied on any other filter as well.

Figure 5:
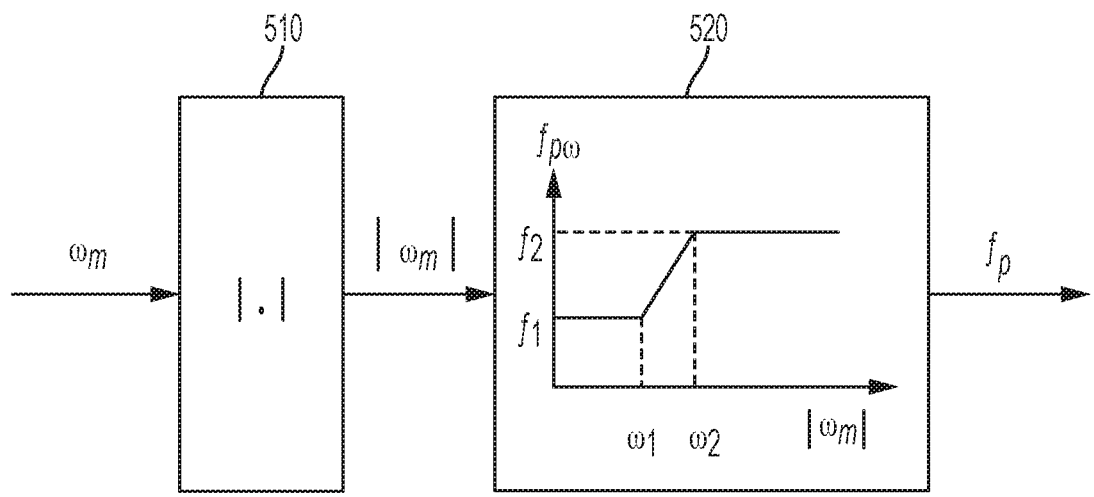
FIG. 5 depicts filter parameter scheduling versus motor velocity according to one or more embodiments.

FIG. 5 depicts filter parameter scheduling versus motor velocity according to one or more embodiments. FIG. 5 depicts an example scenario where a low-pass filter is used as the filter 240. Dither noise is most audible when the motor velocity is low (i.e., the handwheel is stationary). As the motor velocity increases, the dither noise gets masked by other noises, such as those due to the mechanical system 170, and filtering is not performed. Hence, the filter cutoff frequency may be scheduled to be low at lower motor velocities and vice versa. An example of the cutoff frequency scheduling versus motor velocity is shown in the plot 520 of FIG. 5. The filter parameter determination module 210 may use the received motor speed signal to compute an absolute value (510) and based on the absolute value of the motor speed determine the filter parameter, in this case low-pass filter cutoff frequency. The determined filter parameters are used to configure the filter 240.

As depicted in the example of FIG. 5, the cutoff frequency is kept at a low value of $f_1$ at motor velocities less than $\omega_1$, then increased linearly from $\omega_1$ to $\omega_2$ and then kept at a high value $f_2$ above velocities of $\omega_2$. This operation may be mathematically represented as follows.

$$f_{p\omega}(\omega_m) = \begin{cases} f_1, & |\omega_m| < \omega_1 \\ f_1 + (\omega_m - \omega_1)\frac{f_2 - f_1}{\omega_2 - \omega_1}, & \omega_1 \le |\omega_m| < \omega_2 \\ f_2, & |\omega_m| \ge \omega_2 \end{cases}$$

It should be noted that the while the function is shown to be piecewise linear, any other function may be used instead as long as the trends are similar. For instance, a nonlinear function involving an exponential function as shown below may be used instead.

$$f_{p\omega}(\omega_m) = \max\left(a, 1 - e^{-\frac{|\omega_m|}{a}}\right)$$

Here, $\alpha$ is a tunable parameter that may be changed to vary the shape of the cutoff frequency function.

Further, in one or more examples, in addition to or alternatively of using the motor speed, the filter parameter determination module 210 uses the vehicle speed to determine the filter parameters. At high vehicle speeds, the engine noise masks the dither noise, so the cutoff frequency may be increased at such conditions to improve performance and maintain stability. At stall or near stall conditions (i.e., low vehicle speeds) dither noise is highly audible, and hence the cutoff frequency is kept low. Functions similar to the ones presented above are used for velocity and/or vehicle acceleration.

Further yet, in one or more examples, the filter parameter determination module 210 may further use handwheel torque to determine the filter parameters. Dither noise is modeled as a function of both the magnitude and frequency content of handwheel torque. The noise is significantly audible at higher load conditions. Hence, filtering is only performed above a particular threshold value of handwheel torque. An example function (hard switch) is shown in FIG. 6.

Figure 6:
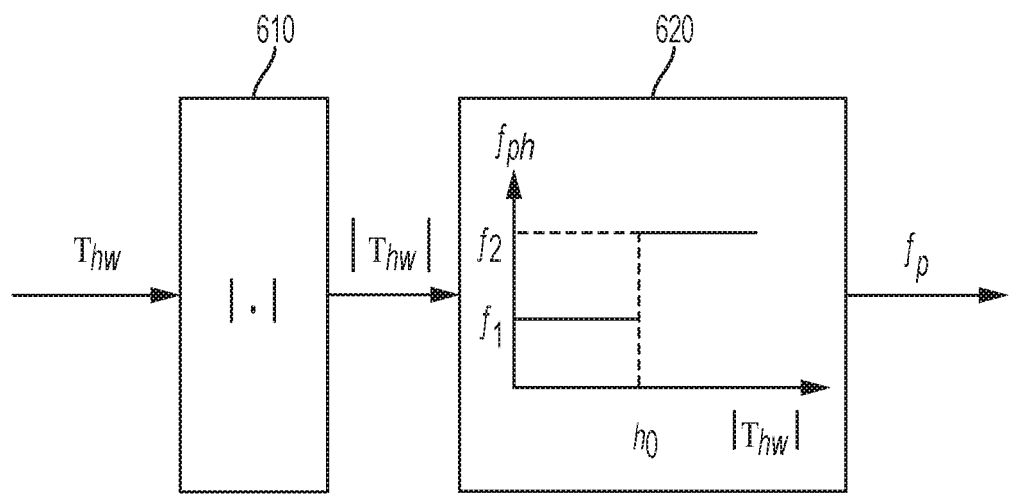
FIG. 6 depicts filter parameter scheduling versus handwheel torque magnitude according to one or more embodiments.

As depicted in the FIG. 6, an absolute value of the handwheel torque input signal is computed and used to calibrate the filter parameters for a low-pass filter. In the illustrated example a step function is used where the cutoff frequency of the low-pass filter is configured based on the value of the handwheel torque.

Figure 7:
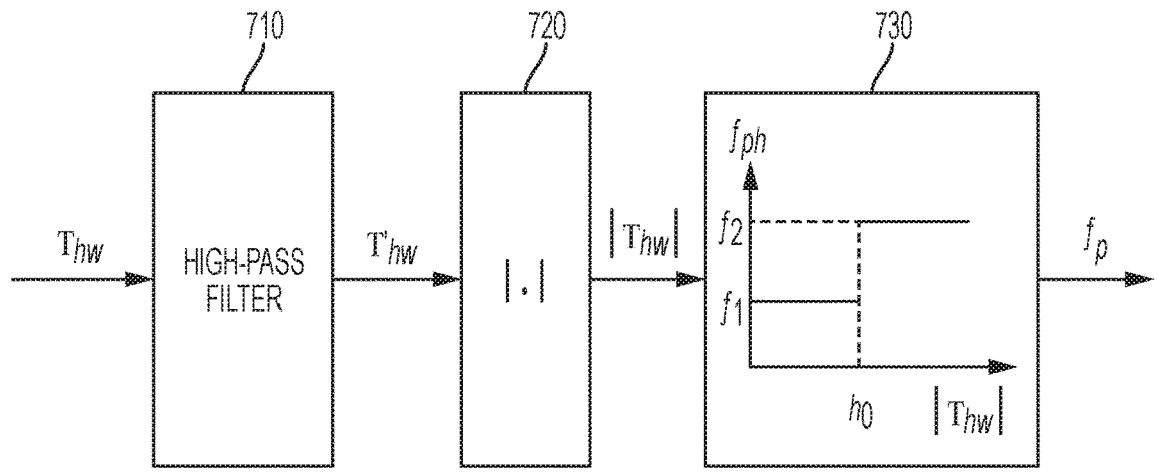
FIG. 7 depicts filter parameter scheduling versus handwheel torque frequency content according to one or more embodiments.

FIG. 7 depicts filter parameter scheduling versus handwheel torque frequency content according to one or more embodiments. During fast maneuvers, the high frequency content of the handwheel torque signal is high. Hence, the filter parameter scheduling may also be done as a function of the frequency content of handwheel torque. FIG. 7 depicts an example of this scheduling function. In the example, the handwheel torque input signal is first filtered by a high-pass filter 710 and the filtered high-pass content ($T'_{hw}$) is used to determine the filter parameters. As described herein, an absolute value of the high-pass content ($T'_{hw}$) is computed (at 720) and used to determine the cutoff frequency of the low-pass filter used as the dither noise filter 240 (at 730). For example, the cutoff frequency is set to a predetermined lower value $f_1$ if the high-pass content ($T'_{hw}$) is below a predetermined value ($H_0$) and a predetermined higher value $f_2$ is used if the high-pass content ($T'_{hw}$) is above (or equal) to the predetermined value $H_0$.

In one or more examples, the filter parameter determination module 210 computes the filter parameters using the multiple input signals as described herein. Further, the arbitration module 220 receives the multiple filter parameters that are determined and determines the final filter parameters, for example filter cutoff frequency, that the filter 240 is tuned to (in real-time). While the arbitration module 220 determines the final filter parameters from the determined multiple filter parameters in several ways, the key is to ensure that vehicle and steering system stability is always ensured, even at the cost of dither noise (if needed). The arbitration module 220 may even disable the dither noise filter 240, for example if the stability of the EPS 40 is being threatened.

An example of arbitration logic implemented by the arbitration module 220 can include a conditional "minimum" function, i.e., a function that takes the minimum of all cutoff frequencies determined based on the different signals, but goes to the maximum or default value if stability monitoring and/or performance functions determine that the lag due to the low cutoff frequency due to the "minimum" operation is not sufficient for ensuring stability and satisfactory performance of the EPS system 40.

Figure 8:
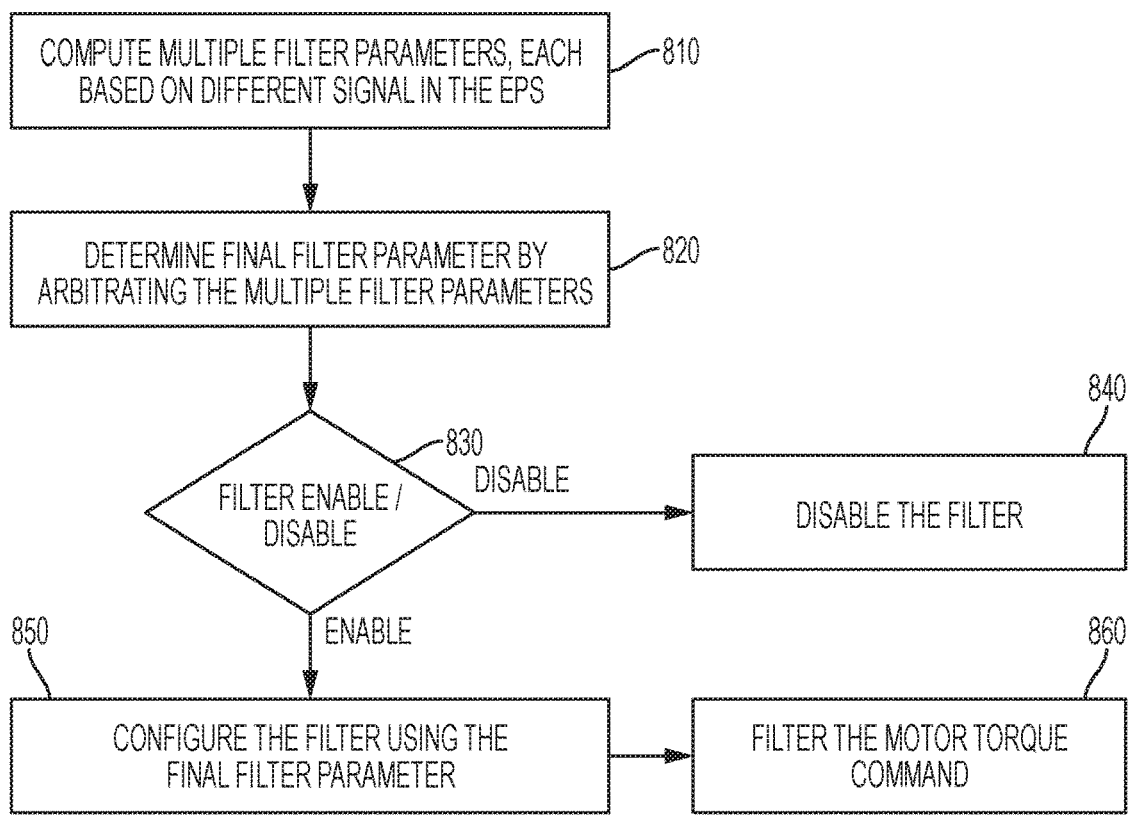
FIG. 8 depicts a flowchart for a method to manage dither noise in an electric power steering system according to one or more embodiments.

FIG. 8 depicts a flowchart for a method to manage dither noise in an electric power steering system according to one or more embodiments. The method includes computing multiple filter parameters, each based on different signal in the EPS, at 810. For example, as described herein the filter parameters are computed using one or more parameters such as motor velocity, acceleration, vehicle speed, handwheel torque. The method further includes determining final filter parameter by arbitrating the multiple filter parameters, at 820. The arbitration may include comparing the filter parameters with each other and/or using predetermined threshold values. In one or more examples, the arbitration may include selecting a lowest (minimum) filter parameter value. Alternatively, or in addition, the arbitration may include selecting a highest (maximum) filter parameter value. Alternatively, or in addition, the arbitration may include selecting both the lowest and highest values.

The selection of the final filter parameter depends on the type of filter that is being used. For example, if the filter is a low-pass filter, a single cut-off frequency parameter is selected. Alternatively, or in addition, in case of a band-pass filter two filter parameter values are selected for the band that is filtered. It should be noted that in other examples different types of filters may be used and accordingly, the filter parameters selected are varied.

Further, the method includes determining whether to enable or disable the filter 240, at 830. For example, a filter enable flag is determined based on the final filter parameter(s) compared with one or more predetermined thresholds. Alternatively, or in addition, the filter may be enabled/disabled based on a stability of the steering system 40, determined independent of the filter parameters. In case the filter is to be disabled based on the filter enable flag being FALSE/OFF, the filter 240 is not used and the motor torque command generated by the controller 26 is passed on to be applied to the motor 19, at 840. Alternatively, if the filter is enabled with the filter enable flag being TRUE/ON, the filter 240 is configured with the final filter parameter(s) from the arbitration module 230, at 850. The motor torque command is then filtered using the configured filter 240 to generate a filtered motor torque command to be applied to the motor 19, at 860.

As described herein applying a motor torque command can include converting the motor torque command into a voltage/current command that is applied to the motor 19 to generate an amount of torque specified by the motor torque command.

The one or more embodiments of the technical solutions described herein address the technical challenge of attenuating dither noise typically present in electric steering systems. The noise generally contains frequency noise content, the range of frequency noise may vary for different systems, and is typically around 200 to 250 Hz. In some cases the frequency range of the noise may coincide with the software loop rates, or may include frequency noise due to PWM and inverter switching. Present technical solutions to attenuate the dither noise include lowering motor control responsiveness or bandwidth, oversampling and filtering of handwheel torque, direct (unconditional) low pass filtering of handwheel torque, and responsiveness reduction of control functions that amplify noise. In one or more examples, a combination of such techniques is used, however using multiple techniques requires coordinated and cumbersome tuning due to multiple functions involved, and long tuning time due to cyclic nature of such tuning process. Further, such techniques result in degraded steering feel and stability. The technical solutions described herein address the technical challenge of attenuating the dither noise in steering systems by conditional filtering of motor torque command, the filtering based on multiple signals such as motor velocity, acceleration, vehicle speed, and handwheel torque. The technical solutions described herein thus reduce dither noise while maintaining performance and stability of the steering system. Further, the technical solutions provide a single function for complete dither noise management, reducing the calibration and tuning time.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A method for attenuating dither noise in a steering system, the method comprising:
   computing a plurality of filter parameters, each filter parameter based on a corresponding signal in the steering system;
   determining at least one final filter parameter from the plurality of filter parameters by arbitrating the plurality of filter parameters;
   dynamically configuring a filter using the at least one final filter parameter; and
   filtering a motor torque command using the filter, a filtered motor torque command being applied to a motor to generate a corresponding amount of torque; and
   wherein at least one of the plurality of filter parameters is configured to attenuate frequencies corresponding to dither noise based on a motor velocity of the motor or a motor acceleration of the motor being less than a corresponding threshold value.

2. The method of claim 1, wherein at least one of the plurality of filter parameters is computed based on a handwheel torque.

3. The method of claim 1, wherein each of the plurality of filter parameters includes a cut-off frequency; and wherein arbitrating the plurality of filter parameters comprises selecting, as the at least one final filter parameter, a filter parameter of the plurality of filter parameters which has a lowest cut-off frequency value.

4. The method of claim 1, wherein each of the plurality of filter parameters includes a cut-off frequency; and wherein arbitrating the plurality of filter parameters comprises selecting, as the at least one final filter parameter, a filter parameter of the plurality of filter parameters which has a highest cut-off frequency value.

5. The method of claim 1, wherein arbitrating the plurality of filter parameters comprises selecting at least two final filter parameters.

6. The method of claim 1, wherein the filter is a low-pass filter.

7. The method of claim 1, wherein the filter is a band-pass filter.

8. An apparatus for managing dither noise in a steering system, the apparatus comprising a controller configured to:
   generate, using a filter, a filtered motor torque command based on an input torque command, the filtered motor torque command being applied to a motor to generate a corresponding amount of torque;
   compute a plurality of filter parameters, each filter parameter based on a corresponding signal in the steering system; and
   determine at least one final filter parameter from the plurality of filter parameters by arbitrating the plurality of filter parameters, and dynamically configure the filter using the at least one final filter parameter; and
   wherein at least one of the plurality of filter parameters is configured to attenuate frequencies corresponding to dither noise based on a motor velocity of the motor or a motor acceleration of the motor being less than a corresponding threshold value.

9. The apparatus of claim 8, wherein a first filter parameter from the plurality of filter parameters is computed based on the motor velocity of the motor.

10. The apparatus of claim 8, wherein a first filter parameter from the plurality of filter parameters is computed based on the motor acceleration of the motor.

11. The apparatus of claim 8, wherein a first filter parameter from the plurality of filter parameters is computed based on vehicle speed.

12. The apparatus of claim 8, wherein a first filter parameter from the plurality of filter parameters is computed based on handwheel torque.

13. The apparatus of claim 8, wherein the filter is a low-pass filter.

14. The apparatus of claim 8, wherein the filter is a band-pass filter.

15. A steering system comprising:
 a motor that generates an amount of torque corresponding to a motor torque command;
 a processor and a memory including instructions that, when executed by the processor cause the processor to:
 generate a filtered motor torque command based on an input torque command, the filtered motor torque command being applied to the motor to generate the corresponding amount of torque;
 compute a plurality of filter parameters, each filter parameter based on a corresponding signal in the steering system; and
 determine at least one final filter parameter from the plurality of filter parameters by arbitrating the plurality of filter parameters, and dynamically configures a filter using the at least one final filter parameter; and
 wherein at least one of the plurality of filter parameters is configured to attenuate frequencies corresponding to dither noise based on a motor velocity of the motor or a motor acceleration of the motor being less than a corresponding threshold value.

16. The steering system of claim 15, wherein at least one of the plurality of filter parameters is determined based on a handwheel torque.

17. The steering system of claim 15, wherein the filter is a low-pass filter.

18. The steering system of claim 15, wherein the filter is a band-pass filter.

\* \* \* \* \*